United States Patent
Hu et al.

(10) Patent No.: US 12,439,449 B2
(45) Date of Patent: Oct. 7, 2025

(54) SYSTEM AND METHOD FOR CHANNEL ACCESS MODE SELECTION

(71) Applicant: Samsung Electronics Co., Ltd., Suwon-si (KR)

(72) Inventors: Liang Hu, San Diego, CA (US); Jung Hyun Bae, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 422 days.

(21) Appl. No.: 17/476,458

(22) Filed: Sep. 15, 2021

(65) Prior Publication Data

US 2022/0124799 A1    Apr. 21, 2022

Related U.S. Application Data

(60) Provisional application No. 63/133,958, filed on Jan. 5, 2021, provisional application No. 63/092,967, filed on Oct. 16, 2020.

(51) Int. Cl.
*H04W 74/0808*    (2024.01)
*H04L 5/00*    (2006.01)
(Continued)

(52) U.S. Cl.
CPC ....... *H04W 74/0808* (2013.01); *H04L 5/0048* (2013.01); *H04W 24/08* (2013.01); *H04W 24/10* (2013.01)

(58) Field of Classification Search
CPC .. H04W 74/0808; H04W 24/08; H04W 24/10
See application file for complete search history.

(56) References Cited

U.S. PATENT DOCUMENTS

| 10,660,127 B2 | 5/2020 | Yang et al. |
| 2020/0112389 A1 | 4/2020 | Fakoorian et al. |

(Continued)

FOREIGN PATENT DOCUMENTS

| WO | WO 2020/125121 A1 | 6/2020 | |
| WO | WO-2022054034 A1 * | 3/2022 | |
| WO | WO-2022081988 A1 * | 4/2022 | .......... H04W 74/006 |

OTHER PUBLICATIONS

Huawei et al., "Channel Access mechanism for 60 GHz unlicensed operation", 3GPP TSG RAN WG1 Meeting #102-3, Aug. 17-28, 2020, R1-2005242 (Year: 2020).*

(Continued)

*Primary Examiner* — Joseph A Bednash
(74) *Attorney, Agent, or Firm* — Lewis Roca Rothgerber Christie LLP

(57) ABSTRACT

A system and method for channel access mode selection. In some embodiments, the method includes receiving, by a user equipment (UE), an interference measurement configuration from a network; performing, by the UE, a first interference measurement according to the interference measurement configuration; and implementing a first channel access mode. The implementing of the first channel access mode may include (i) identifying, by the UE, the first channel access mode based on the first interference measurement; or (ii) reporting, by the UE, a result of the first interference measurement, in order for the first channel access mode based on the first interference measurement to be identified.

20 Claims, 7 Drawing Sheets

(51) Int. Cl.
*H04W 24/08* (2009.01)
*H04W 24/10* (2009.01)

(56) References Cited

U.S. PATENT DOCUMENTS

| | | |
|---|---|---|
| 2020/0205195 A1 | 6/2020 | Sun et al. |
| 2020/0351758 A1 | 11/2020 | Bhattad et al. |
| 2021/0058967 A1 | 2/2021 | Oteri et al. |
| 2021/0176783 A1 | 6/2021 | Xue et al. |
| 2022/0015143 A1* | 1/2022 | Tiirola .............. H04W 72/0446 |
| 2022/0377813 A1* | 11/2022 | Wang ................ H04W 72/0453 |

OTHER PUBLICATIONS

Zte et al, "Discussion on the channel access mechanism for above 52.6GHz"; 3GPP TSG RAN WG1 #102-e, Aug. 17-28, 2020, R1-2005608 (Year: 2020).*

Qualcomm Incorporated, "Channel Access mechanism for NR in 52.6 to 71 GHz band", 3GPP TSG RAN WG1 Meeting #102-e, Aug. 17-28, 2020, R1-2006798 (Year: 2020).*

AT&T, "Channel Access mechanisms for NR from 52.6-71GHz", 3GPP TSG RAN WG1 #102-e, Aug. 17-28, 2020, R1-2005950 (Year: 2020).*

Qualcomm Incorporated, "Channel Access Mechanism and System Level Evaluations for NR in 52.6 to 71 GHz band", 3GPP TSG RAN WG1 Meeting #103-e, e-Meeting, Oct. 26-Nov. 13, 2020, R1-2009362 (Year: 2020).*

* cited by examiner

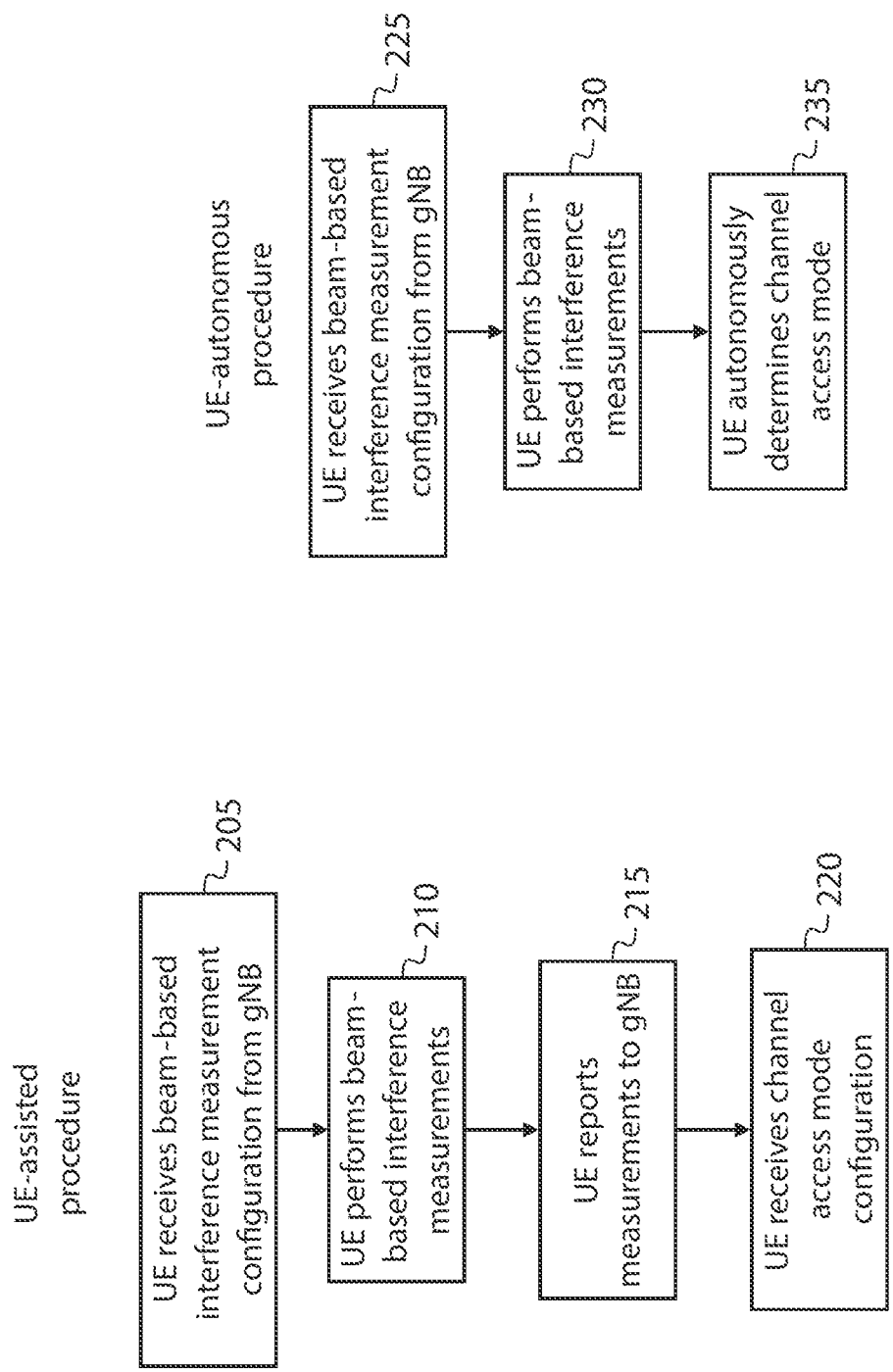

SYSTEM AND METHOD FOR CHANNEL ACCESS MODE SELECTION

CROSS-REFERENCE TO RELATED APPLICATION(S)

The present application claims priority to and the benefit of (i) U.S. Provisional Application No. 63/092,967, filed Oct. 16, 2020, entitled "CHANNEL ACCESS MODE SELECTION FOR NR-U AT 60 GHZ", and (ii) U.S. Provisional Application No. 63/133,958, filed Jan. 5, 2021, entitled "METHODS FOR DYNAMIC CHANNEL SELECTION BASED NO-LBT CHANNEL ACCESS", the contents of both of which are incorporated herein by reference.

FIELD

One or more aspects of embodiments according to the present disclosure relate to wireless communications, and more particularly to a system and method for channel access mode selection.

BACKGROUND

Various channel access modes may be used for transmissions by a transmitter in a wireless communications system, including Listen Before Talk (LBT), and non-LBT channel access modes. Such modes may also use directional beams, omnidirectional beams, or quasi-omnidirectional beams. In various operating scenarios, which may differ, for example, by the extent of interference, different channel access modes may be appropriate.

Thus, there is a need for a system and method for channel access mode selection.

SUMMARY

According to an embodiment of the present disclosure, there is provided a method, including: receiving, by a user equipment (UE), an interference measurement configuration from a network; performing, by the UE, a first interference measurement according to the interference measurement configuration; and implementing a first channel access mode, wherein the implementing of the first channel access mode includes: identifying, by the UE, the first channel access mode based on the first interference measurement; or reporting, by the UE, a result of the first interference measurement, in order for the first channel access mode based on the first interference measurement to be identified.

In some embodiments, the implementing of the first channel access mode includes identifying, by the UE, the first channel access mode based on the first interference measurement.

In some embodiments, the identifying includes: measuring a first medium occupancy ratio; comparing the first medium occupancy ratio to a first threshold; comparing the first medium occupancy ratio to a second threshold; and identifying the first channel access mode based on the results of comparing the first medium occupancy ratio to the first threshold and of comparing the first medium occupancy ratio to the second threshold.

In some embodiments: the measuring of the first medium occupancy ratio includes measuring the first medium occupancy ratio for a first Transmission Configuration Indicator state, and the identifying of the first channel access mode includes: determining that the first medium occupancy ratio is less than the first threshold, and, in response to determining that the first medium occupancy ratio is less than the first threshold, identifying the first channel access mode, for the first Transmission Configuration Indicator state, as no-Listen Before Talk (no-LBT) channel access mode; or determining that the first medium occupancy ratio is between the first threshold and the second threshold, and, in response to determining that the first medium occupancy ratio is between the first threshold and the second threshold, identifying the first channel access mode, for the first Transmission Configuration Indicator state, as long term directional Listen Before Talk (LBT) channel access mode with normal Equivalent Isotropically Radiated Power (EIRP) and duty cycle; or determining that the first medium occupancy ratio is greater than the second threshold and identifying the first channel access mode, for the first Transmission Configuration Indicator state, as directional LBT channel access mode with normal EIRP and duty cycle; or determining that the first medium occupancy ratio and a second medium occupancy ratio are both greater than the second threshold, the second medium occupancy ratio being a medium occupancy ratio measured at a Transmission and Reception Point (TRP), of the network, the Transmission and Reception Point being in communication with the UE, and identifying the first channel access mode, for the first Transmission Configuration Indicator state, as receiver-assisted LBT channel access mode.

In some embodiments, the interference measurement configuration includes a signal threshold for detecting medium busy.

In some embodiments, the interference measurement configuration further includes a set of Transmission Configuration Indicator states, each associated with a respective one of a set of downlink reference signals.

In some embodiments, the performing of the first interference measurement includes performing the first interference measurement with a spatial filter QCL'ed with a first reference signal of the set of downlink reference signals.

In some embodiments: the performing of the first interference measurement includes performing the first interference measurement for a first Transmission Configuration Indicator state of the set of Transmission Configuration Indicator states, and the method further includes performing a second interference measurement for a second Transmission Configuration Indicator state of the set of Transmission Configuration Indicator states.

In some embodiments: the implementing of the first channel access mode includes identifying, by the UE, the first channel access mode based on the first interference measurement; and the method further includes identifying, by the UE, a second channel access mode based on the second interference measurement.

In some embodiments, the implementing of the first channel access mode includes: reporting, by the UE, the result of the first interference measurement in order for the first channel access mode based on the first interference measurement to be identified; and receiving, from the network, an instruction, based on the result, the instruction including an instruction to use the first channel access mode.

In some embodiments, the receiving of the instruction includes receiving the instruction via Radio Resource Control signaling, or System Information Block signaling, or Downlink Control Information signaling.

According to an embodiment of the present disclosure, there is provided a system, including: a User Equipment (UE) including: a radio and a processing circuit, the processing circuit being configured to: receive an interference measurement configuration from a network; perform a first interference measurement according to the interference measurement configuration; and implement a first channel access mode, wherein the implementing of the first channel access mode includes: identifying, by the UE, the first channel access mode based on the first interference measurement; or reporting, by the UE, a result of the first interference measurement, in order for the first channel access mode based on the first interference measurement to be identified.

In some embodiments, the implementing of the first channel access mode includes identifying, by the UE, the first channel access mode based on the first interference measurement.

In some embodiments, the identifying includes: measuring a first medium occupancy ratio; comparing the first medium occupancy ratio to a first threshold; comparing the first medium occupancy ratio to a second threshold; and identifying the first channel access mode based on the results of comparing the first medium occupancy ratio to the first threshold and of comparing the first medium occupancy ratio to the second threshold.

In some embodiments: the measuring of the first medium occupancy ratio includes measuring the first medium occupancy ratio for a first Transmission Configuration Indicator state, and the identifying of the first channel access mode includes: determining that the first medium occupancy ratio is less than the first threshold, and, in response to determining that the first medium occupancy ratio is less than the first threshold, identifying the first channel access mode, for the first Transmission Configuration Indicator state, as no-Listen Before Talk (no-LBT) channel access mode; or determining that the first medium occupancy ratio is between the first threshold and the second threshold, and, in response to determining that the first medium occupancy ratio is between the first threshold and the second threshold, identifying the first channel access mode, for the first Transmission Configuration Indicator state, as long term directional Listen Before Talk (LBT) channel access mode with normal Equivalent Isotropically Radiated Power (EIRP) and duty cycle; or determining that the first medium occupancy ratio is greater than the second threshold and identifying the first channel access mode, for the first Transmission Configuration Indicator state, as directional LBT channel access mode with normal EIRP and duty cycle; or determining that the first medium occupancy ratio and a second medium occupancy ratio are both greater than the second threshold, the second medium occupancy ratio being a medium occupancy ratio measured at a Transmission and Reception Point (TRP), of the network, the Transmission and Reception Point being in communication with the UE, and identifying the first channel access mode, for the first Transmission Configuration Indicator state, as receiver-assisted LBT channel access mode.

In some embodiments, the interference measurement configuration includes a signal threshold for detecting medium busy.

In some embodiments, the interference measurement configuration further includes a set of Transmission Configuration Indicator states, each associated with a respective one of a set of downlink reference signals.

In some embodiments, the performing of the first interference measurement includes performing the first interference measurement with a spatial filter QCL'ed with a first reference signal of the set of downlink reference signals.

In some embodiments: the implementing of the first channel access mode includes: reporting, by the UE, the result of the first interference measurement in order for the first channel access mode based on the first interference measurement to be identified; and receiving, from the network, an instruction, based on the result, the instruction including an instruction to use the first channel access mode; and the receiving of the instruction includes receiving the instruction via Radio Resource Control signaling, or System Information Block signaling, or Downlink Control Information signaling.

According to an embodiment of the present disclosure, there is provided a system, including: a User Equipment (UE) including: a radio and a means for processing, the means for processing being configured to: receive an interference measurement configuration from a network; perform a first interference measurement according to the interference measurement configuration; and use a first channel access mode, the first channel access mode being based on the first interference measurement.

BRIEF DESCRIPTION OF THE DRAWINGS

These and other features and advantages of the present disclosure will be appreciated and understood with reference to the specification, claims, and appended drawings wherein:

FIG. 2A is a flowchart, according to an embodiment of the present disclosure;

FIG. 2B is a flowchart, according to an embodiment of the present disclosure;

DETAILED DESCRIPTION

Figure 1A:
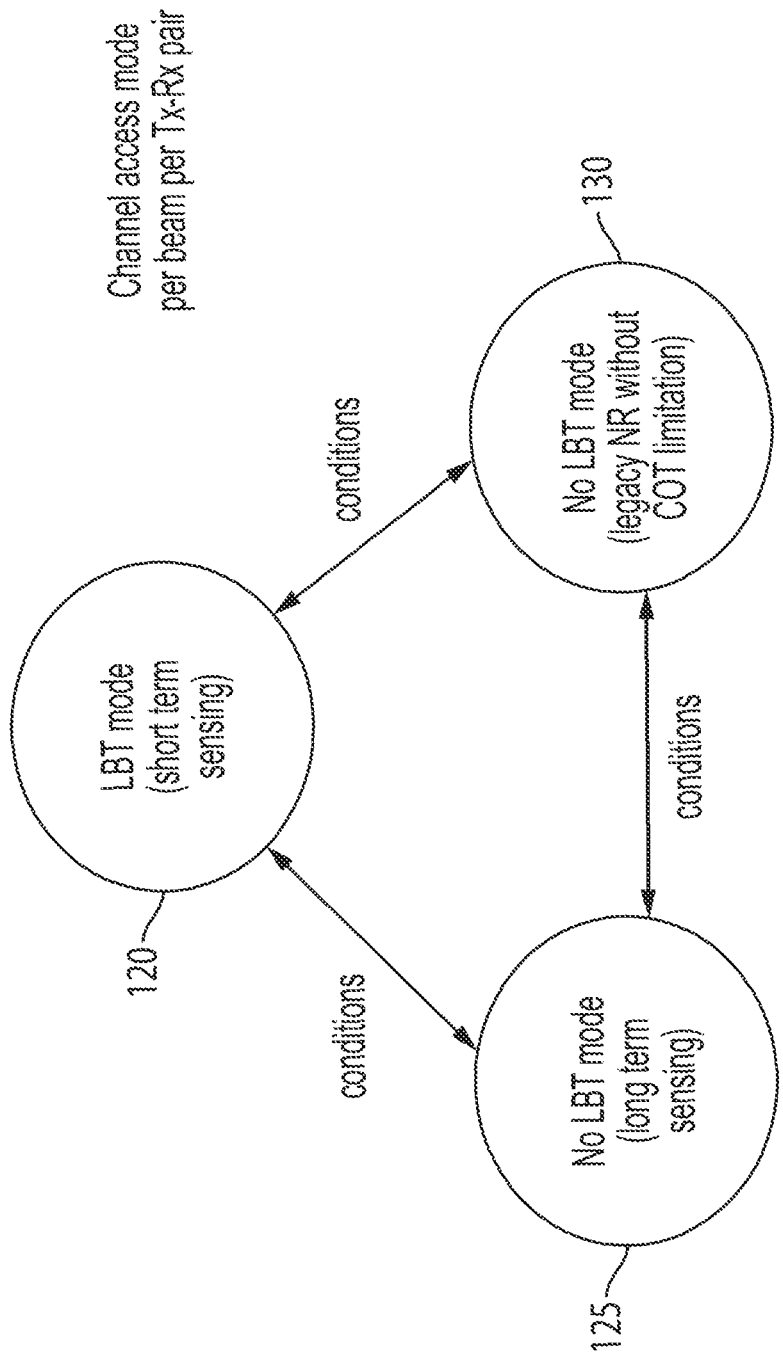
FIG. 1A is a mode diagram, according to an embodiment of the present disclosure.

The detailed description set forth below in connection with the appended drawings is intended as a description of exemplary embodiments of a system and method for channel access mode selection provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

New Radio (NR) 60 GHz unlicensed deployments are envisioned to involve highly beamformed transmissions from nodes under strict Equivalent, Isotropically Radiated Power (EIRP) limits. Further, given the propagation characteristics in these bands, the interference, even under demanding traffic scenarios, may have very different characteristics. Even in the absence of any coordination mechanism, most users may experience minimal interference under shared bandwidth operation. Due to beamformed operation under strict EIRP limits, NR 60 GHz unlicensed deployments may have a lower likelihood of encountering damaging interference. However, interference, though less likely, can be damaging when present. In summary, beam collisions may impact some User Equipments (UEs) more than others based on serving and interfering beam directions in a specific deployment scenario. Therefore, the suitability of the channel access method can be deployment scenario or use case dependent. One channel access method which is optimal for one scenario may be sub-optimal for another scenario. As used herein, the phrase "user equipment" is used as a countable noun even though the noun it contains ("equipment") may not be countable in ordinary English.

At a meeting of the 3rd Generation Partnership Project (3GPP) Technical Specification Group Radio Access Network (TSG RAN) Working Group 1 (RAN1) support of both Listen Before Talk (LBT) and non-LBT channel access methods was agreed upon. To maximize spatial reuse with the lowest rate of beam collisions and least overhead, it may be advantageous for the User Equipment (UE) and network node (gNB) to know which channel access method to use in a given deployment scenario. Accordingly, in some embodiments, 1) conditions of optimal channel access method selection and 2) a mechanism of switching between different channel access methods depending on the deployment scenario are employed, to achieve good system performance. The channel access type may be semi-statically configured by the gNB, in some cases with assistance from the UE. Alternatively, the UE may be able to make long-term measurements and autonomously switch between LBT access and non-LBT access. This may involve the definition of measurement signals, common metrics and a UE procedure for the multiple access methods used by the UE.

The following agreement was made in RAN1-102e on NR-U channel access at 60 GHz:
  For gNB/UE to initiate a channel occupancy, both channel access with LBT mechanism(s) and a channel access mechanism without LBT are supported
  FFS: LBT mechanisms such as Omni-directional LBT, directional LBT and receiver assisted LBT type of schemes when channel access with LBT is used.
  FFS: If operation restrictions for channel access without LBT are needed, e.g. compliance with regulations, and/or in presence of ATPC, DFS, long term sensing, or other interference mitigation mechanisms
  FFS: The mechanism and condition(s) to switch between channel access with LBT and channel access without LBT (if local regulation allows)

The following channel access methods were discussed in 3GPP RAN1 and can be applied in NR 60 GHz: (Quasi-) omni-directional LBT, Directional LBT, No LBT, Receiver assisted LBT, Long Term Sensing based deployment mode, and Dynamic frequency selection (DFS).

Figure 1B:
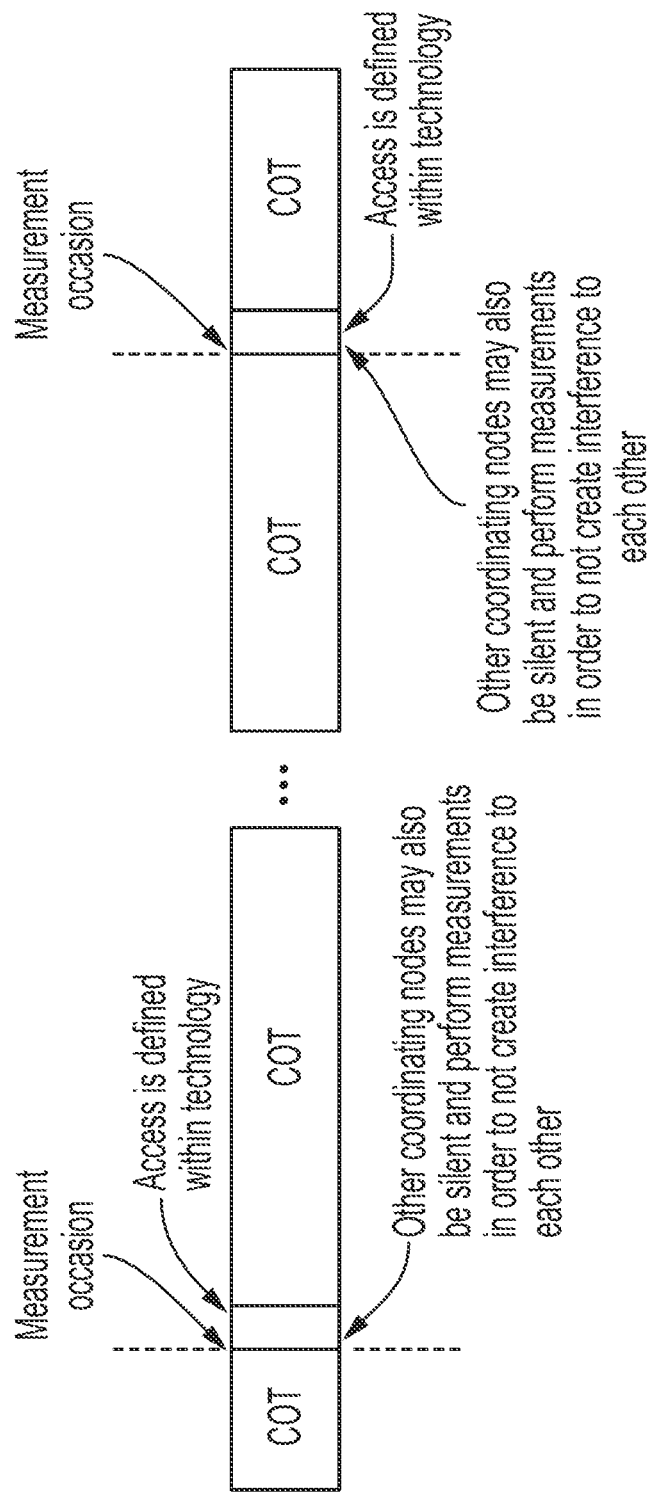
FIG. 1B is a signal sequence diagram, according to an embodiment of the present disclosure.
Figure 1C:
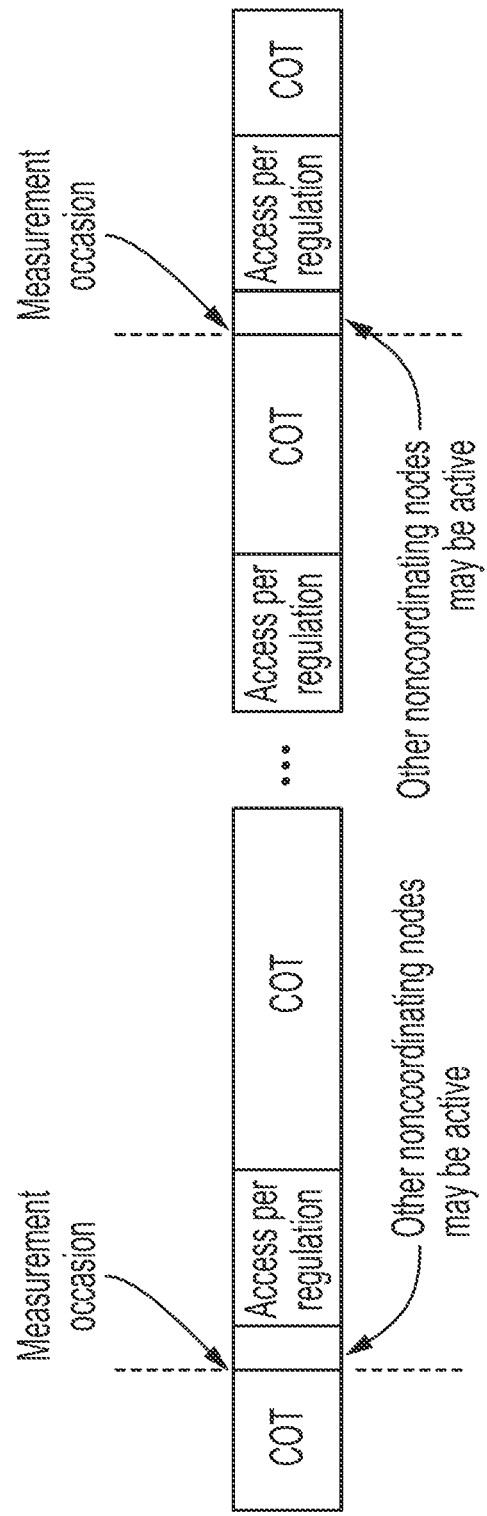
FIG. 1C is a signal sequence diagram, according to an embodiment of the present disclosure.

Various channel access modes may be available in New Radio Unlicensed (NRU) 60 GHz. Referring to FIG. 1A, such modes may include an LBT mode 120, a first No LBT mode (or "No-LBT" mode or "Non LBT" mode) 125, which may involve long term sensing, and a second No LBT mode 130, which may be a legacy NR mode without a Channel Occupancy Time (COT) limitation. In the scenario illustrated in FIG. 1B, the node periodically performs measurements at the measurement occasion and does not detect significant energy during these instances. The node interprets this as the absence of a colliding interferer and continues to operate without any restrictions on its channel access. In the scenario illustrated in FIG. 1C, the node detects a signal during the measurement occasion(s) that exceeds a certain pre-configured energy threshold. This may be configured to be multiple measurement occasions to ensure robustness. The node then interprets this as the presence of a colliding interferer and switches to a mode in which short term per-COT LBT or another long term scheme (e.g., Dynamic Frequency Selection (DFS) or Automatic Transmit Power Control (ATPC)) is employed for the next pre-configured amount of time.

FIGS. 2A and 2B illustrate a UE-assisted procedure and a UE-autonomous procedure, in some embodiments. In FIG. 2A, at 205, the UE receives a beam-based interference measurement configuration from the gNB; at 210, the UE performs beam-based interference measurements; at 215, the UE reports the measurements to the gNB; and at 220, the UE receives a channel access mode configuration from the gNB. In FIG. 2B, at 225, the UE receives a beam-based interference measurement configuration from the gNB; at 230, the UE performs beam-based interference measurements; and, at 215, the UE autonomously determines the channel access mode.

RAN1 agreed to support No LBT based channel access mode in regions in which LBT is not mandated by regulation. Even if LBT is not mandated by regulation, there may be strong inter-Radio Access Technology (inter-RAT) interference to a legacy NR system e.g., from WiGi or from other operators sharing the same spectrum. Also, it is not clear how fairness among multiple RATs sharing the same spectrum can be ensured without LBT. Therefore, aspects of both interference management and channel access fairness may be enhanced by developing Non-LBT based channel access using legacy NR as the baseline.

Dynamic Frequency Selection (DFS) and Adaptive Transmitter Power Control (ATPC) are the two candidate channel access schemes which are being specified by the European Telecommunications Standards Institute (ETSI) and were mentioned by some participants in the Study Item (SI) phase as the No LBT channel access schemes. DFS and ATPC (which are long term interference management schemes) have much less overhead than LBT (which is a short term interference management scheme). However, whether and how to specify DFS and ATPC in the NR spec is not yet settled; this will be done in the Work Item (WI) phase.

The principle of dynamic frequency selection is that a system selects or switches the channel on which it operates to avoid a channel occupied by other systems. An example of DFS requirements is captured for radar avoidance and uniform loading of spectrum. DFS appears as an interesting coexistence mechanism candidate for NR. According to the European Conference of Postal and Telecommunications Administrations (CEPT), DFS is assessed to be an effective and cost-efficient coexistence mechanism (to mitigate interference from multi gigabit wireless systems to fixed service applications).

Automatic transmit power control is also considered by CEPT to be an effective and cost-efficient coexistence mechanism. CEPT describes ATPC as a mechanism adjusting the transmit power to the minimum power that is necessary to operate the link with the desired performance. ATPC requires feedback from the receiver, but does not involve additional measurements on channel occupancy. The existing NR uplink power control can be enhanced to provide ATPC also from the coexistence viewpoint. However, there are several open issues related to ATPC on downlink, such as which DL signals and channels the ATPC should be applied to, how dynamic DL ATPC should be, and how much standardization is needed.

NW controlled and UE autonomous channel access mode selection may be performed as follows. In some embodiments, the network configures the UE interference measurement configuration via UE specific Radio Resource control (RRC) signaling. The configuration includes (i) the frequency and time resources of Reference Signal (RS) measurement e.g., Channel State Information Reference Signal (CSI-RS) or Channel-State Information-Interference Measurement (CSI-IM) and Sounding Reference Signal (SRS) which are only transmitted by UEs and network nodes (gNBs) in neighboring cells, (ii) the measurement time window, (iii) the signal threshold for detecting medium busy, (iv) the measurement mode, e.g., directional beam measurement, and/or quasi-omni directional beam measurement, and (v) a set of Transmission Configuration Indicator (TCI) states associated with a set of downlink (DL) RSs used for a specific UE's local interference measurement and for an interference measurement, towards a specific UE, performed by a network node (gNB) or Transmission and Reception Point (TRP) gNB/TRP's. The set of TCI states are the TCI states which are configured by the network for a specific UE's uplink (UL) transmission and DL reception. For example, the network provides the entire set of TCI states after receiving a Reference Signal Received Power (RSRP) report from a UE during a beam refinement procedure. Alternatively, the network configures the size of the set of TCI states containing the set of DL RSs that have the highest measured RSRP values to the UE; then, in the beam refinement procedure, the UE determines the set of TCI states containing the set of DL RSs of the configured size with the highest measured RSRP values, as measured by the measurement.

On the gNB side, the gNB can optionally configure itself with a similar interference measurement configuration towards a serving UE. The configuration includes (i) the frequency and time resources of RS signal measurement i.e., CSI-RS or CSI-IM and SRS which are only transmitted by UEs and gNBs in neighboring cells, (ii) the measurement time window, (iii) the signal threshold for detecting medium busy, (iv) the measurement mode i.e., directional beam measurement, and/or quasi-omni directional beam measurement, and (iv) a set of TCI states associated with a set of DL RS used for the gNB/TRP's interference measurement towards a specific UE. As used herein, "gNB/TRP" means (i) a network node having a single TRP, or (ii) a TRP of a network node having multiple TRPs. The system may proceed according to one of four options, referred to in the following as Option 1 through Option 4. A gNB with multiple TRPs may perform interference measurements with respect to each of the TRPs, or with respect to a subset of the TRPs.

In Option 1, the set of DL RSs is a set of narrow beam DL RSs that have the highest measured RSRP values at the specific UE among all the possible DL RSs that the UE received from gNB, i.e., this set is the outcome of the beam refinement between the specific UE and gNB. If quasi-omni directional beam measurement mode is enabled, one option is that the TCI state(s) of the quasi-omni directional beam(s) can be implicitly inferred from the set of TCI states of the narrow beams at the UE. For example, there is a pre-defined mapping for a specific UE between the TCI state of a quasi-omni-directional beam and a set of TCI states of the narrow beams which are the child beams of this quasi-omnidirectional beam. The mapping between the TCI state of the quasi-omni directional beam and the set of TCI states of the narrow beams at each UE may be UE specific, e.g., it may be RRC configured by the gNB. In particular, each of DL RSs of the narrow beam is QCL'ed (where QCL means Quasi-Colocation) with the DL RSs of one of the quasi-omni direction beams. Then, each of the narrow beams is also the child beam of at least one quasi-omni directional beam at the UE. This implies that there may be multiple TCI states of the quasi-omni directional beams.

In Option 2, if quasi-omni directional beam measurement mode is enabled, the other option is that the set of DL RSs are grouped into two subsets with two different types: narrow beam DL RSs and broad beam DL RSs. The subset of narrow beam DL RSs have the highest measured RSRP values at the specific UE among all the possible narrow beam DL RSs that the UE received from the gNB, i.e., the subset is the outcome of the beam refinement between the specific UE and gNB. Thus, the TCI states are also divided into two groups where one of the groups is for the narrow beam DL RSs. The subset broad beam DL RS is one DL RS which has the strongest measured RSRP measured at the specific UE among all the possible broad beam RSs that the UE received from the gNB. In particular, each of DL RSs of the narrow beams is QCL'ed with the DL RS of the broad beam or quasi-omni direction beam. Each of the narrow beams is also the child beam of the quasi-omni directional beam at the UE.

In Option 3, when a UE is connected to multiple TRPs, the set of DL RSs is a set of narrow beam DL RSs. Each TRP transmits a narrow beam DL RS, of the set of narrow beam DL RSs transmitted by the multiple TRPs, that has the highest measured RSRP value at the specific UE among all the possible narrow beam DL RSs that the UE received from that TRP, i.e., the narrow beam DL RS is the outcome of the beam refinement between the specific UE and the specific TRP. If quasi-omni directional beam measurement mode is enabled, the set of DL RSs of the set of quasi-omni directional beams can be implicitly inferred from this set of narrow beam DL RSs. The mapping between the TCI states of the set of quasi-omni directional beams and the set of TCI states of the narrow beams at each UE can be UE specific, e.g., it may be RRC configured by the gNB. In particular, each of the DL RSs of the narrow beams is QCL'ed with at least one of DL RS of quasi-omni direction beams. Each of the narrow beams is the child beam of at least one quasi-omni directional beam at the UE.

In Option 4, when a UE is connected to multiple TRPs, the set of DL RSs is grouped into two subsets with two different types: narrow beam DL RSs and broad beam DL RSs. Each of the subset of narrow beam DL RSs from a specific TRP has the highest measured RSRP value at the specific UE among all the possible narrow beam DL RSs that the UE received from the specific TRP i.e., the subset is the outcome of the beam refinement between the specific UE and the specific TRP. The TCI states are also divided into two groups where the two groups are for the narrow beam DL RSs and broad beam DL RSs, respectively. In particular, each of the narrow beam DL RSs is QCL'ed with at least one of broad beam DL RSs. Each of the narrow beams is the child beam of at least one quasi-omni directional beam at the UE.

At each configured measurement resource, by performing one or simultaneous (e.g., concurrent) multiple directional measurements (depending on UE capability) where each measurement receive (Rx) spatial filter is QCL'ed with one of the configured DL RSs, the UEs measure the medium occupancy ratio or RSRP or Received Signal Strength Indicator (RSSI) with an Rx spatial filter that is QCL'ed with the configured DL RS within a measurement time window from the neighboring cell DL and UL interferences and report them to the network via RRC signaling or as a part of Channel State Information (CSI) feedback, either periodically or on-demand, as requested by the network. As used herein, two antenna ports are said to be quasi co-located (QCL'ed) if properties of the channel over which a symbol on one antenna port is conveyed can be inferred from the channel over which a symbol on the other antenna port is conveyed. Similarly, a spatial filter may be said to be QCL'ed with a downlink reference signal if the antenna port corresponding to the spatial filter is QCL'ed with an antenna port used to receive the downlink reference signal.

The gNB may optionally perform the same measurement of the medium occupancy ratio or RSRP or RSSI with an Rx spatial filter that is QCLed with the configured DL RS within a measurement time window from the neighboring cell DL and UL interferences. In addition, if quasi-omni directional beam measurement mode is enabled, the UE also performs the quasi-omni directional measurements where the Rx spatial filter is QCL'ed with the DL RS for quasi-omni directional beam or the Rx spatial filter is inferred from the set of narrow beam DL RSs. The measurement report may include the medium occupancy ratio per configured TCI state of the narrow beam, and/or the medium occupancy ratio per TCI state of the quasi-omni directional beam within a measurement time window or averaged over several measurement time windows. The gNB/TRP may optionally perform the same quasi-omni directional beam measurements as the UE performs (as described above).

The medium occupancy ratio per measurement beam/TCI state is defined as the percentage of measurement resources per measurement beam over which the measured RSRP of the CSI-IM or SRS is larger than a threshold within the measurement time window. Alternatively, the medium occupancy ratio per measurement beam/TCI state is defined as the percentage of measurement resources used per measurement beam over which the measured RSSI is larger than a threshold within the measurement time window. In particular, for a quasi-omni directional beam measurement, the threshold may be lower compared to the one for a narrow directional beam measurement. The Received Signal Strength Indicator (RSSI), defined as linear average of the total received power (in Watts) observed only in the configured orthogonal frequency-division multiplexing (OFDM) symbols of the configured measurement time resource(s), in the configured measurement bandwidth from all sources, including co-channel serving and non-serving cells, adjacent channel interference, thermal noise, etc. Alternatively, the UE may decide its channel access mode per configured TCI state autonomously without reporting to the network.

The UE also reports its beamforming transmit (Tx) and Rx capability to the network via RRC signaling; for example, it may report the beamforming gain being low directional, medium directional, of high directional. Alternatively, the UE may decide its channel access mode per configured TCI state autonomously without reporting to the network.

The network may make a decision on the channel access mode per configured TCI state of each serving UE. It may configure the channel access modes of the serving UEs via UE-specific RRC signaling or System Information Block (SIB) signaling. Alternatively, the UE may make a decision on the channel access mode per configured TCI state autonomously, i.e., by itself. The network may also make a decision on the channel access mode that it will use, per configured TCI state, towards a serving UE.

For high directional capable UEs, the network may always configure No-LBT access mode for all the configured TCI states to these UEs, or the UE itself may always select No-LBT channel access mode for all the configured TCI states. For high directional capable gNBs, the gNB may always configure No-LBT access mode for all the configured TCI states towards a given UE.

The No-LBT mode can either be the DFS mode described above, or in a transmission mode with stricter parameters, for example (i) limiting interference level (EIRP, conducted power) when employing transmissions without medium sensing, (ii) Under no-sensing operation, operating with a maximum limitation on the duty cycle or burst duration occupied by the node, or (iii) a mode with an unchanged spatial footprint of interference, in which the beam width and the number of beams play a part, given the spatial nature of interference, and constant—unchanging—footprints may be incentivized for channel access. Example of joint stricter parameters include (i) a mode in which No-LBT medium access by a transmitter is permitted with an EIRP e provided the duty cycle of transmission is below a threshold d and (ii) a mode in which the total duty cycle d represents the fraction of time during which the node is transmitting averaged over a time window, $d \in [0,1]$.

Several methods, including four methods identified in the text below as Method 1 through Method 4, may be employed to select a channel access mode based on whether the measured medium occupancy ratio is greater than or less than a first threshold, threshold 1, and whether the measured medium occupancy ratio is greater than or less than a second threshold, threshold 2.

In Method 1, for low and medium capable UEs, the gNB configures the channel access mode per directional measurement beam/configured TCI state per UE, and the channel access mode per the quasi-omni directional measurement beam/configured TCI state per UE, or, alternatively, the UE decides for itself the channel access mode per directional measurement beam/configured TCI state, and the channel access mode for the quasi-omni directional measurement beam per configured TCI state per UE. As used herein, "measurement beam/configured TCI state" means either per measurement beam or per configured TCI state, there being a one-to-one correspondence between measurement beams and configured TCI states. For a low or medium capable gNB, the gNB may configure the channel access mode per the UE's directional measurement beam/configured TCI state towards a serving UE, and the channel access mode per the UE's quasi-omni directional measurement beam/configured TCI state towards a serving UE. Alternatively, the gNB may configure the channel access mode per the gNB's directional measurement beam/configured TCI state towards a serving UE, and the channel access mode per gNB's quasi-omni directional measurement beam/configured TCI state towards a serving UE. If the medium occupancy ratio for each of the configured TCI states for which a UE needs to make a beam measurement is less than the first threshold, threshold1, the network configures the UE or the UE configures itself with no-LBT channel access mode for that TCI state, with an EIRP and duty cycle with the possible restrictions as described above. Alternatively, the network or the UE configures the UE with DFS mode, as described above, for that TCI state. For gNB/TRP as the transmitter (i.e., if the channel access mode selection is being made for the gNB or the TRP is the transmitter), the gNB/TRP side determines the channel access mode towards a serving UE based on the UE's beam measurement report, comparing against threshold1. If the medium occupancy ratio is less than threshold1, the gNB configures itself with no-LBT channel access mode for that TCI state, with an EIRP and duty cycle with the possible restrictions as described above. Alternatively, gNB configures the itself with the DFS mode described above for that TCI state.

Alternatively, for gNB/TRP as the transmitter, the gNB/TRP side does the same beam measurement as the UE, comparing against a threshold1. If less than a threshold1, the gNB configures itself with no-LBT channel access mode for that TCI state, with an EIRP and duty cycle with the possible restrictions described above. Alternatively, the gNB configures the itself with the DFS mode described above for that TCI state.

In Method 2, if the medium occupancy ratio for each of the configured TCI states for which a UE needs to make a beam measurement is between threshold2 and threshold1, the network or the UE configures the UE with long term directional LBT channel access mode for that specific measurement beam/TCI state, with normal EIRP and duty cycle. In some embodiments employing long term directional LBT (in a mode of operation similar to COT transmission), once LBT is successful, the UE acquires a time duration during which the channel access of either the UE or the gNB is without LBT with normal EIRP. Long term LBT is performed before one attempted transmission, where the long term LBT requires the UE to monitor the medium occupancy ratio over a much longer time scale than normal LBT. Once long term LBT is successful, the duration of no-LBT may last for K ms (e.g., several hundred ms). Alternatively, long term LBT is performed with a certain probability before any attempted transmission, where the probability is inversely proportional to the UE monitored medium occupancy over the long term. For gNB/TRP as the transmitter, if the medium occupancy ratio for each of the configured TCI states for which a UE needs to make a beam measurement is between threshold2 and threshold1, the gNB configures itself with long term directional LBT channel access mode for that specific measurement beam/TCI state towards that UE, with normal EIRP and duty cycle.

Alternatively, for gNB/TRP as the transmitter, if the medium occupancy ratio for each of the configured TCI states for which a gNB/TRP needs to make a beam measurement is between threshold2 and threshold1, the gNB configures itself with long term directional LBT channel access mode for that specific measurement beam/TCI state, with normal EIRP and duty cycle. In some embodiments employing long term directional LBT (in a mode of operation similar to COT transmission), once LBT is successful, the gNB/TRP acquires a time duration during which the channel access of either the UE or the gNB is without LBT with normal EIRP. Long term LBT is performed before one attempted transmission, where the long term LBT requires the gNB to monitor the medium occupancy ratio over a much longer time scale than normal LBT. Once long term LBT is successful, the duration of no-LBT may last for K ms (e.g., several hundred ms). Alternatively, long term LBT is performed with a certain probability before any attempted transmission, where the probability is inverse proportional to the gNB monitored medium occupancy over the long term.

In method 3, if the medium occupancy ratio for each of the configured TCI states for which a UE needs to make a beam measurement is larger than threshold2, the network or the UE configures the UE with directional LBT channel access mode for that specific measurement beam/TCI state, with normal EIRP and duty cycle. For gNB/TRP as the transmitter, if the medium occupancy ratio for each of the configured TCI states for which a UE needs to make a beam measurement is larger than threshold2, the gNB configures itself with directional LBT channel access mode for that specific measurement beam/TCI state towards that serving UE, with normal EIRP and duty cycle.

Alternatively, for gNB/TRP as the transmitter, if the medium occupancy ratio for each of the configured TCI states for which a gNB/TRP needs to make a beam measurement is larger than threshold2, the gNB configures itself with directional LBT channel access mode for that specific measurement beam/TCI state, with normal EIRP and duty cycle.

In method 4, if the medium occupancy ratio for each of the configured TCI states for which a UE needs to make a beam measurement is larger than threshold2 measured at both the UE and gNB/TRP, the network or the UE configures the UE with receiver-assisted LBT channel access mode for that specific measurement beam/TCI state. For gNB/TRP as the transmitter, if the medium occupancy ratio for each of the configured TCI states for which a UE needs to make a beam measurement is larger than threshold2 measured at both the UE and gNB/TRP, the gNB configures itself with receiver-assisted LBT channel access mode for that specific measurement beam/TCI state towards that serving UE. Additionally, the UE may have the option to be configured explicitly in using quasi-omni-directional beam in some conditions. For example, if the medium occupancy ratios for a certain fraction (e.g., X %) of the directional measurement beams/TCI states are larger than threshold2, the network or the UE configures the UE with quasi-omni-directional LBT channel access mode for a quasi-omni-directional measurement beam/TCI state which is the parent beam of those directional measurement beams, with normal EIRP and duty cycle. In particular, each DL RS of the directional measurement beams with medium occupancy ratio larger than threshold2 is QCL'ed with the DL RS of the quasi-omni-directional measurement beam. For gNB/TRP as the transmitter, the gNB/TRP also configures itself with quasi-omni-directional LBT channel access mode.

Alternatively, for gNB/TRP as the transmitter, if the medium occupancy ratio for each of the configured TCI states for which a gNB/TRP needs to make a beam measurement is larger than threshold2 measured at both the UE and gNB/TRP, the gNB configures itself with receiver-assisted LBT channel access mode for that specific measurement beam/TCI state. Additionally, the gNB/TRP may have the option to be configured explicitly in using quasi-omni-directional beam in some conditions. For example, if the medium occupancy ratios for a certain fraction (e.g., X %) of the directional measurement beams/TCI states are larger than threshold2, the gNB/TRP configures itself with quasi-omni-directional LBT channel access mode for a quasi-omni-directional measurement beam/TCI state which is the parent beam of those directional measurement beams, with normal EIRP and duty cycle. In particular, each DL RS of the directional measurement beams with medium occupancy ratio larger than threshold2 is QCL'ed with the DL RS of the quasi-omni-directional measurement beam.

Additionally, the gNB can configure the preferred beam/TCI state for channel access per UE, in addition to the channel access mode per beam per UE, with the aim of optimizing the overall system spectral efficiency and minimizing interference. Alternatively, if a UE interference measurement is not available, the UE may initially be configured, by itself or by the gNB, in one channel access mode per a specific beam/TCI state which contains the DL RS from the gNB or specific TRP with the highest measured RSRP at the UE (i.e., the specific beam/TCI state may be the outcome of the beam refinement between the UE and gNB/a specific TRP). The gNB/TRP can update the UE's channel access mode per TCI state via RRC signaling, after the gNB/TRP exchanges NACK and ACK messages with the UE within a time window. Alternatively, the UE itself can update the UE's channel access mode per TCI state, after the gNB/TRP exchanges NACK and ACK messages with the UE within a time window.

Likewise, for gNB/TRP as the transmitter, if a gNB/TRP interference measurement is not available, the gNB/TRP initially configures itself in one channel access mode per a specific beam/TCI state which contains the DL RS from gNB or specific TRP with the highest measured RSRP at the UE (i.e., the specific beam/TCI state may be the outcome of the beam refinement between the UE and gNB/a specific TRP). The gNB/TRP may update its own channel access mode per TCI state, after gNB/TRP exchanges NACK and ACK messages with a specific UE within a time window.

For instance, when the UE is configured with No-LBT for a specific beam/TCI state initially for initializing the channel occupancy, the gNB may change the UE's channel access mode to directional LBT for that specific TCI state via RRC signaling, after the gNB has generated more than a pre-configured number of consecutive HARQ NACKs within a time window for the UL transmissions or has received more than a pre-configured number of consecutive HARQ NACKs within a time window for the DL transmission. Alternatively, the UE itself can change the UE's channel access mode to directional LBT for that specific TCI state, after the UE receives more than a pre-configured number of consecutive HARQ NACKs within a time window for the UL transmissions or transmits more than a pre-configured number of consecutive HARQ NACKs within a time window for the DL transmission.

Likewise, for gNB/TRP as the transmitter, when the gNB/TRP is in No-LBT for a specific beam/TCI state initially for initializing the channel occupancy, the gNB can change its channel access mode to directional LBT for that specific TCI state, after the gNB has generated more than a pre-configured number of consecutive HARQ NACKs within a time window for the UL transmissions or has received more than a pre-configured number of consecutive HARQ NACKs within a time window for the DL transmissions.

For instance, when the UE is configured with directional LBT for a specific TCI state initially for initializing the channel occupancy, the gNB can change the UE's channel access mode to quasi-omni-directional LBT or receiver-assisted LBT for that specific TCI state via RRC signaling, after the gNB has generated more than a pre-configured number of consecutive HARQ NACKs within a time window for the UL transmissions or has received more than a pre-configured consecutive number of HARQ NACKs within a time window for the DL transmission. Alternatively, the UE itself can change the UE's channel access mode to quasi-omni-directional LBT or receiver LBT for that specific TCI state via RRC signaling, after the UE receives more than a pre-configured number of consecutive HARQ NACKs within a time window for the UL transmissions or transmits more than a pre-configured consecutive number of HARQ NACKs within a time window for the DL transmission.

Likewise, for gNB/TRP as the transmitter, when the gNB/TRP is in directional LBT for a specific TCI state initially for initializing the channel occupancy, the gNB can change its channel access mode to quasi-omni-directional LBT or receiver-assisted LBT for that specific TCI state, after the gNB has generated more than a pre-configured number of consecutive HARQ NACKs within a time window for the UL transmissions or has received more than a pre-configured consecutive number of HARQ NACKs within a time window for the DL transmission.

For instance, when the UE is configured with directional LBT for a specific TCI initially for initializing the channel occupancy, the gNB can change the UE's channel access mode to no-LBT or long term LBT for that specific TCI state via RRC signaling, after the gNB has generated more than a pre-configured number of consecutive ACKs within a time window for the UL transmissions or has received more than a pre-configured number of consecutive ACKs within a time window for the DL transmission. Alternatively, the UE itself can change the UE's channel access mode to no-LBT or long term LBT for that specific TCI state, after the UE receives more than a pre-configured number of consecutive ACKs within a time window for the UL transmissions or transmits more than a pre-configured number of consecutive ACKs within a time window for the DL transmission.

Likewise, for gNB/TRP as the transmitter, when the gNB/TRP is in directional LBT for a specific TCI initially for initializing the channel occupancy, the gNB can change its channel access mode to no-LBT or long term LBT for that specific TCI state, after the gNB has generated more than a pre-configured number of consecutive ACKs within a time window for the UL transmissions or has received more than a pre-configured number of consecutive ACKs within a time window for the DL transmission.

Once the UE receives the channel access mode per configured TCI state from the network, the UE can decide which TCI states to use for the upcoming transmission. Alternatively, the network explicitly selects the TCI state, directional or quasi-omni directional transmission beam and associated channel access mode for a specific UE and informs the specific UE. Depending on the UE capability, a multi-panel UE may simultaneously use multiple beams with multiple TCI states for transmissions e.g., to different TRPs. Alternatively, a single panel UE may use the quasi-omni-directional beam for transmission to different TRPs, instead of transmitting to each TRP using different TCI states in a TDM manner, which may create a long delay and large overhead. Likewise, for gNB/TRP as the transmitter, once the gNB/TRP determines the channel access mode per configured TCI state, the gNB/TRP can decide which TCI states to use for the upcoming transmission towards a serving UE. Depending on the capability of the gNB/TRP, a high capability gNB/TRP may simultaneously use multiple beams with multiple TCI states for transmissions, e.g., to different UEs. Alternatively, a low capability gNB/TRP may use the quasi-omni-directional beam for transmission to different UEs, instead of transmitting to each UE using different TCI states in a TDM manner, which may create a long delay and large overhead.

Figure 3:
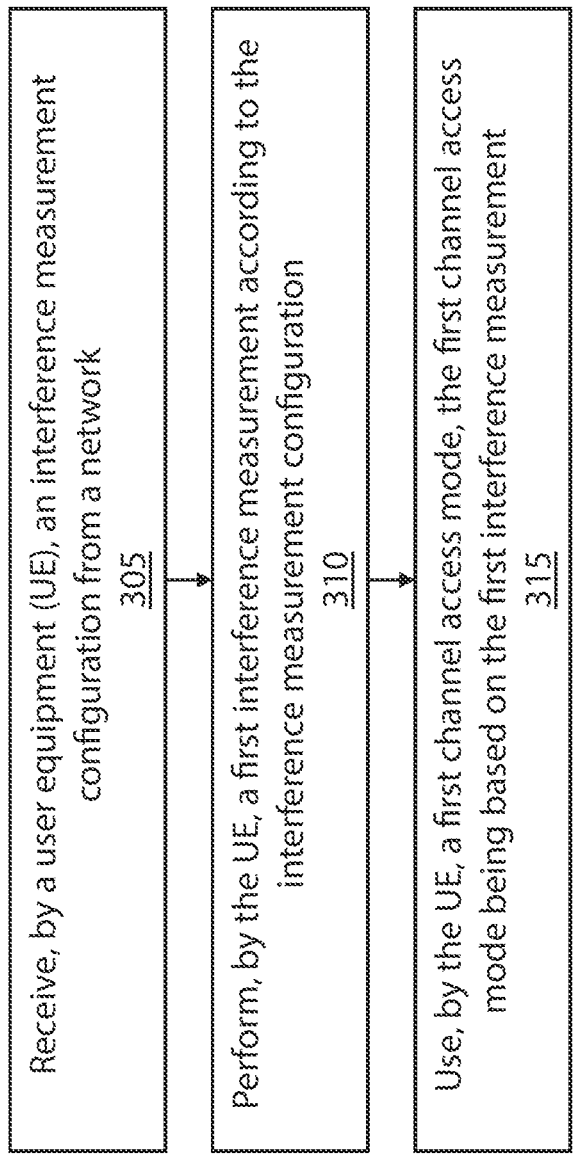
FIG. 3 is a flowchart, according to an embodiment of the present disclosure.
Figure 4:
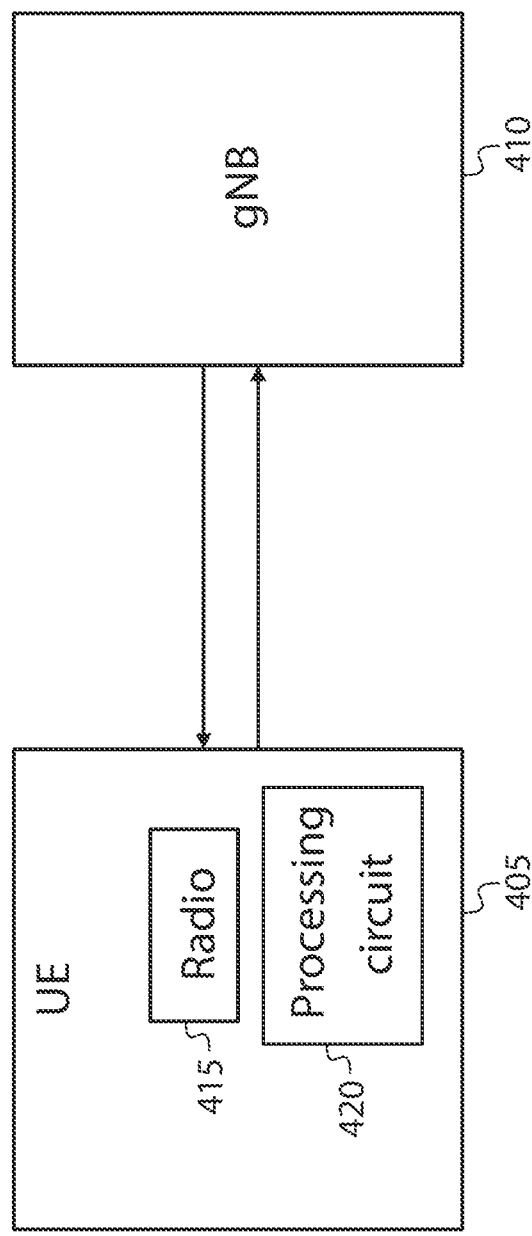
FIG. 4 is a block diagram, according to an embodiment of the present disclosure.

FIG. 3 shows a flowchart of a method, in some embodiments, at 305, a UE receives an interference measurement configuration from a network, at 310, the UE performs a first interference measurement according to the interference measurement configuration, and, at 315, the UE uses a first channel access mode, the first channel access mode being based on the first interference measurement. FIG. 4 shows a system including a UE 405 and a gNB 410, in communication with each other. The UE may include a radio 415 and a processing circuit (or a means for processing) 420, which may perform various methods disclosed herein, e.g., the method illustrated in FIG. 3. For example, the processing circuit 420 may receive, via the radio 415, transmissions from the network node (gNB) 410, and the processing circuit 420 may transmit, via the radio 415, signals to the gNB 410.

Some embodiments provide methods for Dynamic Channel Selection based No-LBT channel access as discussed in further detail below. Such embodiments may enable the dynamic frequency selection operation in NRU 60 GHz. In the following, the UE channel bandwidth (BW) where the transmission and receptions between the UE and gNB take place are defined to be equal to the UE sensing BW where the UE or gNB performs an interference measurement, e.g., an RSSI measurement.

Figure 5:
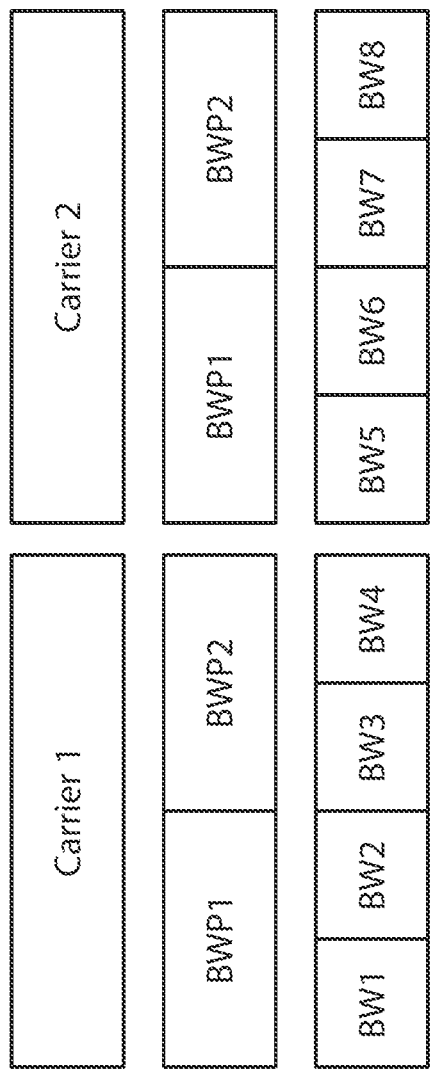
FIG. 5 is a frequency configuration diagram, according to an embodiment of the present disclosure.

As shown in FIG. 5, in a generic deployment scenario there may be two carriers deployed in the network: carrier 1 and carrier 2. Carrier 1 consists of two bandwidth parts, BWP1 and BWP2, whereas carrier 2 consist of BWP1 and BWP2. Finally, there are 8 channels (CHs) BW1-8 in carrier 1 and 2, with the channel (CH) bandwidth equal to the UE channel BW or UE sensing BW defined above.

To enable dynamic frequency selection operation in NRU 60 GHz, the following UE procedures may be employed by using RSSI measurements as an example, however the descriptions provided in this disclosure are not limited to RSSI measurements and may be applied to any general measurement procedures for DFS.

1. The UE performs RSSI measurements per TCI states at all CHs (e.g., BW1-8) including the ones outside the active BWP in the serving carrier and the ones in carriers other than the serving carriers with a certain network-configured periodicity. To minimize the UE measurement overhead, the periodicity does not have to be same for all and can alternatively be specifically configured per TCI state per CH, for example, where the periodicity for the measurement and/or reporting of the TCI state per channel with smaller variation over time is larger compared to the case with larger measurement variation over time. In this case, the measurement variation can be evaluated by calculating the standard deviation of the RSSI measurement over a set of measurement occasions. The set of TCI states for RSSI measurements at this UE is configured by the network, which corresponds to the set of CSI-RS references with good measured RSRP values.

2. The UE performs both intra carrier and inter carrier RSSI measurements at pre-defined measurement gaps and occasions configured by the network. Alternatively, the UE can perform both intra carrier and inter carrier RSSI measurements without pre-configured gaps and occasions. In this case, it is up to the UE implementation to decide when to perform both intra carrier and inter carrier RSSI measurements, whereas the scheduling availability restrictions are enforced in the specification to avoid the UE exchanging DL and UL traffic with the network during the set of symbols during which the UE performs both intra carrier and inter carrier RSSI measurements.

3. The UE reports the long term average results of RSSI measurements and channel busy ratio per CH per TCI state to the network.

4. The network decides to select a new CH for a given TCI state for the UE, if the current CH for a given TCI state is too congested or interference limited, based on the UE RSSI measurement reports.

5. The network may command the UE to switch to the new CH in a given TCI state, as follows: 1) if the new CH is within the same BWP, then the UE performs Tx and Rx only on the new CH; 2) if the new CH is in a different BWP within the same carrier, the network commands the UE to do BWP switching via RRC or DCI and then Tx and Rx in the new CH of the new BWP; 3) the network can also command the UE to do beam switching together with channel switching, i.e., the network activates a new TCI state for UE PDCCH monitoring via Media Access Control Control Elements (MAC CE and indicates it to UE PDSCH transmission via DC; 4) if the new CH is in a different carrier, then the network commands the UE to make a handover to the new carrier and Tx and Rx on that new CH.

With respect to the procedures of the embodiments listed above, there may be two effects on the specification-mandated behavior of the UE:

1. UEs currently only perform RSSI measurements within the active BWP in the serving carrier, however some embodiments require the UE to perform RSSI measurements also outside active BWP in carrier 1 e.g., in inactive BWPs in the serving carrier.

2. Some embodiments also require the UE to perform RSSI measurements in other carriers, other than the serving carrier. This may be similar to Radio Resource Management (RRM) measurement for handover, where the inter-carrier measurement is based on SSB or CSI-RS.

There are two options for realizing the above two points: 1. with measurement gap, and 2. without measurement gap. In the 2nd option, like the procedure described in TS 38.133, new scheduling restrictions need to be developed with respect to RSSI measurements. The potential effects on the specification-mandated behavior of the UE are in TS 38.331 (new RRC configuration of measurement gap, measurement events) and TS 38.133 (new scheduling restrictions without gap, requirements with gap). In the following, the term DFS RSSI means the same thing as the term RSSI measurement used above.

The UE capable of performing DFS RSSI measurements shall be able to measure RSSI (which are defined in TS 38.215) of the channels (CHs) defined above within active DL BWP, inactive DL BWP in the serving carrier, and other channels (CHs) within the inactive DL BWPs in other RRC configured non-serving carriers. The measurements requirements in this clause apply for Time Division Duples (TDD) mode only.

DFS RSSI measurements are applicable for RRC_CONNECTED both inter and intra-frequency when a DFS-RSSI measurement resource is configured within the active BWP, inactive BWP of the serving carrier, inactive BWPs of the RRC configured non-serving carrier(s).

For performing DFS-RSSI measurement in FR2, the UE can assume the configured measurement resources are QCL-ed with TypeD to one of the latest received Physical Downlink Shared Channels (PDSCHs) and the latest monitored Control Resource Set (CORESET).

When configured by the network, the UE shall be able to perform a DFS-RSSI measurement of configured rssi-ResourceConfigDFS. The subcarrier spacing for DFS-RSSI measurement resource configuration can be the same or different from the subcarrier spacing of the active BWP or an inactive BWP. The UE shall perform DFS-RSSI measurements with the SCS of the active BWP or inactive BWP.

The requirements in clause 9.7.3 of TS 38.133 apply, provided the measurement resources configured for CLI-RSSI measurements are measurable.

A measurement resource configured for DFS-RSSI shall be considered measurable when for each relevant DFS-RSSI resource the following conditions are met: DFS-RSSI related side conditions given in clauses 10.1.22.2 of TS 38.113 for FR1 and FR2 for a corresponding band.

The UE shall send DFS-RSSI reports only for report configurations according to reportType which is dfsPeriodical or dfsEventTriggered when the DFS-RSSI report is configured.

Periodic Reporting:

Reported DFS-RSSI measurements contained in periodically triggered measurement reports shall meet the requirements in clause TS 38.133 10.1.22.2.

Event-Triggered Periodic Reporting:

Reported DFS-RSSI measurements contained in periodically triggered measurement reports shall meet the requirements in clauses TS 38.133 10.1.22.2.

The first report in event triggered periodic measurement reporting shall meet the requirements specified in clause TS 38.113 9.7.3.3.3.

Event Triggered Reporting

Reported DFS-RSSI measurements contained in periodically triggered measurement reports shall meet the requirements in clause TS 38.133 10.1.22.2.

The UE shall not send any event triggered measurement reports as long as no reporting criterion is fulfilled.

Measurement Capability

The UE should be capable of performing DFS-RSSI measurements based on the configured resource, provided that the maximum number of DFS-RSSI measurement resources for the UE does not exceed X, where X can be larger than 64.

DFS-RSSI Measurement Period

The UE shall be capable of performing DFS-RSSI measurement based on the configured measurement resource within $T_{DFS\_RSSI\_measurement\_period}$. The UE shall be able to provide a single RSSI sample for each measurement resource configured for DFS-RSSI measurement occurring with a configured periodicity. The DFS-RSSI measurement period $T_{DFS\_RSSI\_measurement\_period}$ corresponds to the DFS-RSSI measurement resource periodicity, which is configured by higher layers via RSSI-PeriodicityAndOffset. $T_{DFS\_RSSI\_measurement\_period}$ can be different for each TCI state per channel. If the DFS-RSSI measurement resources configured for measurements are partially or fully overlapping with Signal Synchronization Block (SSB) based Measurement Timing Configuration (SMTC) window, SSB or CSI-RS configured for Radio Link Monitoring (RLM), Bidirectional Forwarding Detection (BFD), Candidate Beam Detection (CBD) or Layer 1 RSRP (L1-RSRP) measurement or measurement gaps; requirements are not specified for $T_{DFS-RSSI\_measurement\_period}$.

Scheduling Availability of UE During DFS Measurements

Scheduling availability restrictions when the UE is performing DFS measurements which are DFS-RSSI are described in the following clause.

Scheduling Availability of UE Performing Measurement on FR1

The following scheduling restriction applies due to DFS measurements.

The UE is not expected to transmit PUCCH/PUSCH/SRS on OFDM symbols of any channel in the serving carrier and RRC configured non-serving carriers on which the UE performs DFS measurements in a given channel in the serving carrier or a RRC configured non-serving carrier, and on X data symbol of any channel in the serving carrier and RRC configured non-serving carriers before an OFDM symbol used for DFS measurements in a given channel in the serving carrier or another RRC configured non-serving carrier for a set of different subcarrier spacings. X depends on the specific selected Subcarrier Spacing (SCS).

For a UE which does not support dfs-RSSI-FDM-DL, the UE is not expected to receive PDCCH/PDSCH/CSI-RS for tracking/CSI-RS for CQI on OFDM symbols of any channel in the serving carrier and RRC configured non-serving carriers on which the UE performs DFS-RSSI measurements in a given channel in the serving carrier or another RRC configured non-serving carrier, and on X data symbol of any channel in the serving carrier and RRC configured non-serving carriers before an OFDM symbol used for DFS-RSSI measurements in a given channel in the serving carrier or another RRC configured non-serving carrier for a set of different subcarrier spacings. X depends on the specific selected SCS.

For a UE which does not support dfs-RSSI-FDM-DL, the UE is not expected to receive PDCCH/PDSCH/CSI-RS for tracking/CSI-RS for Channel Quality Indicator (CQI) on OFDM symbols of any channel in the serving carrier and RRC configured non-serving carriers on which the UE performs DFS-RSSI measurements in a given channel in the serving carrier or another RRC configured non-serving carrier, and on Y (Y>X) data symbols of any channel in the serving carrier and RRC configured non-serving carriers before an OFDM symbol used for DFS-RSSI measurements in a given channel in the serving carrier or another RRC configured non-serving carrier for another set of subcarrier spacings. Y depends on the specific selected SCS.

When TDD intra-band carrier aggregation is configured, the scheduling restrictions on one serving and non-serving cells where DFS-RSSI measurements are performed apply on all serving cells in the same band on the symbols that fully or partially overlap with restricted symbols.

Scheduling Availability of UE Performing Measurement on FR2

The following scheduling restriction applies due to DFS measurements.

The UE is not expected to transmit PUCCH/PUSCH/SRS on OFDM symbols with a given TCI state of any channel in the serving carrier and RRC configured non-serving carriers on which the UE performs DFS measurements with that given TCI state in any of the channels, and on X data symbol with that given TCI state before an OFDM symbol used for DFS measurements with that given TCI state in any of the channels in the serving carrier and RRC configured non-serving carriers for a set of different subcarrier spacings. X depends on the specific selected SCS.

For the UE which does not support dfs-RSSI-FDM-DL, the UE is not expected to receive PDCCH/PDSCH/CSI-RS for tracking/CSI-RS for CQI on OFDM symbols with a given TCI state of any channel in the serving carrier and RRC configured non-serving carriers on which the UE performs DFS-RSSI measurements with that given TCI state in any of the channels, and on X data symbol before an OFDM symbol used for DFS-RSSI measurements with that given TCI state in any of the channels in the serving carrier and RRC configured non-serving carriers for a set of subcarrier spacings. X depends on the specific selected SCS.

When TDD intra-band carrier aggregation is configured, the scheduling restrictions of a given TCI state on one serving and non-serving cells where DFS-RSSI measurements are performed apply on all serving cells in the same band on the symbols with the same TCI state that fully or partially overlap with restricted symbols.

The UE shall set up the RSSI measurement timing configuration (RMTC) per TCI state per channel in accordance with the received rmtc-Periodicity, rmtc-SubframeOffset if configured, otherwise determined by the UE randomly, i.e., the first symbol of each RMTC occasion occurs at first symbol of an SFN and subframe of the PCell meeting the following conditions:

SFN mod T=FLOOR(rmtc-SubframeOffset/10);
subframe=rmtc-SubframeOffset mod 10;
with T=rmtc-Periodicity/10;

On the concerned frequency, the UE shall not consider RSSI measurements outside the configured RMTC occasion which lasts for measDuration for RSSI and channel occupancy measurements.

As used herein, "identifying" a channel access mode, or "determining" a channel access mode means selecting a channel access mode to be used by a transmitted (e.g., by a UE), from among a plurality of candidate channel access modes. As used herein, "implementing" a channel access mode means preparing, by a transmitter (e.g., by a UE), to use the channel access mode after it has been identified (e.g., by the UE or by the network), as the channel access mode to be used. Such preparing may include transitioning to a state (if the transmitter is not already in the state) in which the next transmission will be made using the implemented channel access mode.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB. As mentioned above, a processing circuit, or means for processing, in a UE, may perform methods described herein, e.g., by transmitting signals (through a radio of the UE) or by receiving signals (through the radio of the UE), and, in some instances, by performing further processing.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for channel access mode selection have been specifically described and illustrated herein, many modifications and variations will be apparent to those skilled in the art. Accordingly, it is to be understood that a system and method for channel access mode selection constructed according to principles of this disclosure may be embodied other than as specifically described herein. The invention is also defined in the following claims, and equivalents thereof.

What is claimed is:

1. A method, comprising:
   receiving, by a user equipment (UE), an interference measurement configuration from a network;
   performing, by the UE, a first interference measurement according to the interference measurement configuration; and
   based on the first interference measurement:
      receiving, by the UE, a first channel access mode indicated to the UE per Transmission Configuration Indicator (TCI) state per UE; or
      determining, by the UE, the first channel access mode per TCI state per UE.

2. The method of claim 1, further comprising identifying, by the UE, the first channel access mode based on the first interference measurement.

3. The method of claim 2, wherein the identifying comprises:
   measuring a first medium occupancy ratio;
   comparing the first medium occupancy ratio to a first threshold;
   comparing the first medium occupancy ratio to a second threshold; and
   identifying the first channel access mode based on a result of comparing the first medium occupancy ratio to the first threshold or a result of comparing the first medium occupancy ratio to the second threshold.

4. The method of claim 3, wherein the measuring of the first medium occupancy ratio comprises measuring the first medium occupancy ratio for a first Transmission Configuration Indicator state, and
   the method further comprises:
      measuring a second medium occupancy ratio for a second Transmission Configuration Indicator state; and
      determining that the second medium occupancy ratio is less than a first threshold, and, in response to determining that the second medium occupancy ratio is less than the first threshold, identifying a second channel access mode, for the second Transmission Configuration Indicator state, as no-Listen Before Talk (no-LBT) channel access mode; or
      determining that the second medium occupancy ratio is between the first threshold and a second threshold, and, in response to determining that the second medium occupancy ratio is between the first threshold and the second threshold, identifying the second channel access mode, for the second Transmission Configuration Indicator state, as long term directional Listen Before Talk (LBT) channel access mode with normal Equivalent Isotropically Radiated Power (EIRP) and duty cycle; or
      determining that the second medium occupancy ratio is greater than the second threshold and identifying the second channel access mode, for the second Transmission Configuration Indicator state, as directional LBT channel access mode with normal EIRP and duty cycle; or
      determining that the second medium occupancy ratio and a third medium occupancy ratio are both greater than the second threshold, the third medium occupancy ratio being a medium occupancy ratio measured at a Transmission and Reception Point (TRP), of the network, the Transmission and Reception Point being in communication with the UE, and identifying the second channel access mode, for the second Transmission Configuration Indicator state, as receiver-assisted LBT channel access mode.

5. The method of claim 1, wherein the interference measurement configuration comprises a signal threshold for detecting medium busy.

6. The method of claim 1, wherein the interference measurement configuration further comprises a set of Transmission Configuration Indicator states, each associated with a respective one of a set of downlink reference signals.

7. The method of claim 6, wherein the performing of the first interference measurement comprises performing the first interference measurement with a spatial filter quasi co-located (QCL'ed) with a first reference signal of the set of downlink reference signals.

8. The method of claim 6, wherein:
   the performing of the first interference measurement comprises performing the first interference measurement for a first Transmission Configuration Indicator state of the set of Transmission Configuration Indicator states, and
   the method further comprises performing a second interference measurement for a second Transmission Configuration Indicator state of the set of Transmission Configuration Indicator states.

9. The method of claim 8, further comprising:
   identifying, by the UE, the first channel access mode based on the first interference measurement; and
   identifying, by the UE, a second channel access mode based on the second interference measurement.

10. The method of claim 1, further comprising:
    reporting, by the UE, a result of the first interference measurement; and
    receiving, from the network, an instruction, based on the result, the instruction comprising an instruction to use the first channel access mode.

11. The method of claim 10, wherein the receiving of the instruction comprises receiving the instruction via Radio Resource Control signaling, or System Information Block signaling, or Downlink Control Information signaling.

12. A system, comprising:
    a User Equipment (UE) comprising:
       a radio and a processing circuit,
    the processing circuit being configured to:
       receive an interference measurement configuration from a network;
       perform a first interference measurement according to the interference measurement configuration; and
       based on the first interference measurement:
          receive a first channel access mode indicated to the UE per Transmission Configuration Indicator (TCI) state per UE; or
          determine the first channel access mode per TCI state per UE.

13. The system of claim 12, wherein the processing circuit is configured to cause the UE to perform identifying the first channel access mode based on the first interference measurement.

14. The system of claim 13, wherein the identifying comprises:
    measuring a first medium occupancy ratio;
    comparing the first medium occupancy ratio to a first threshold;

comparing the first medium occupancy ratio to a second threshold; and identifying the first channel access mode based on a result of comparing the first medium occupancy ratio to the first threshold or a result of comparing the first medium occupancy ratio to the second threshold.

15. The system of claim 14, wherein the measuring of the first medium occupancy ratio comprises measuring the first medium occupancy ratio for a first Transmission Configuration Indicator state.

16. The system of claim 12, wherein the interference measurement configuration comprises a signal threshold for detecting medium busy.

17. The system of claim 12, wherein the interference measurement configuration further comprises a set of Transmission Configuration Indicator states, each associated with a respective one of a set of downlink reference signals.

18. The system of claim 17, wherein the performing of the first interference measurement comprises performing the first interference measurement with a spatial filter quasi co-located (QCL'ed) with a first reference signal of the set of downlink reference signals.

19. The system of claim 12, wherein the processing circuit is configured to cause the UE to perform:

reporting a result of the first interference measurement; and receiving, from the network, an instruction, based on the result, the instruction comprising an instruction to use the first channel access mode.

20. A system, comprising:
a User Equipment (UE) comprising:
    a radio and a means for processing,
the means for processing being configured to:
    receive an interference measurement configuration from a network;
    perform a first interference measurement according to the interference measurement configuration; and
    based on the first interference measurement:
        receive a first channel access mode indicated to the UE per Transmission Configuration Indicator (TCI) state per UE; or
        determine the first channel access mode per TCI state per UE.

* * * * *